March 7, 1967  LE ROY R. BOGGS  3,307,998
FILAMENT WINDING EQUIPMENT
Filed Sept. 18, 1962  9 Sheets-Sheet 2

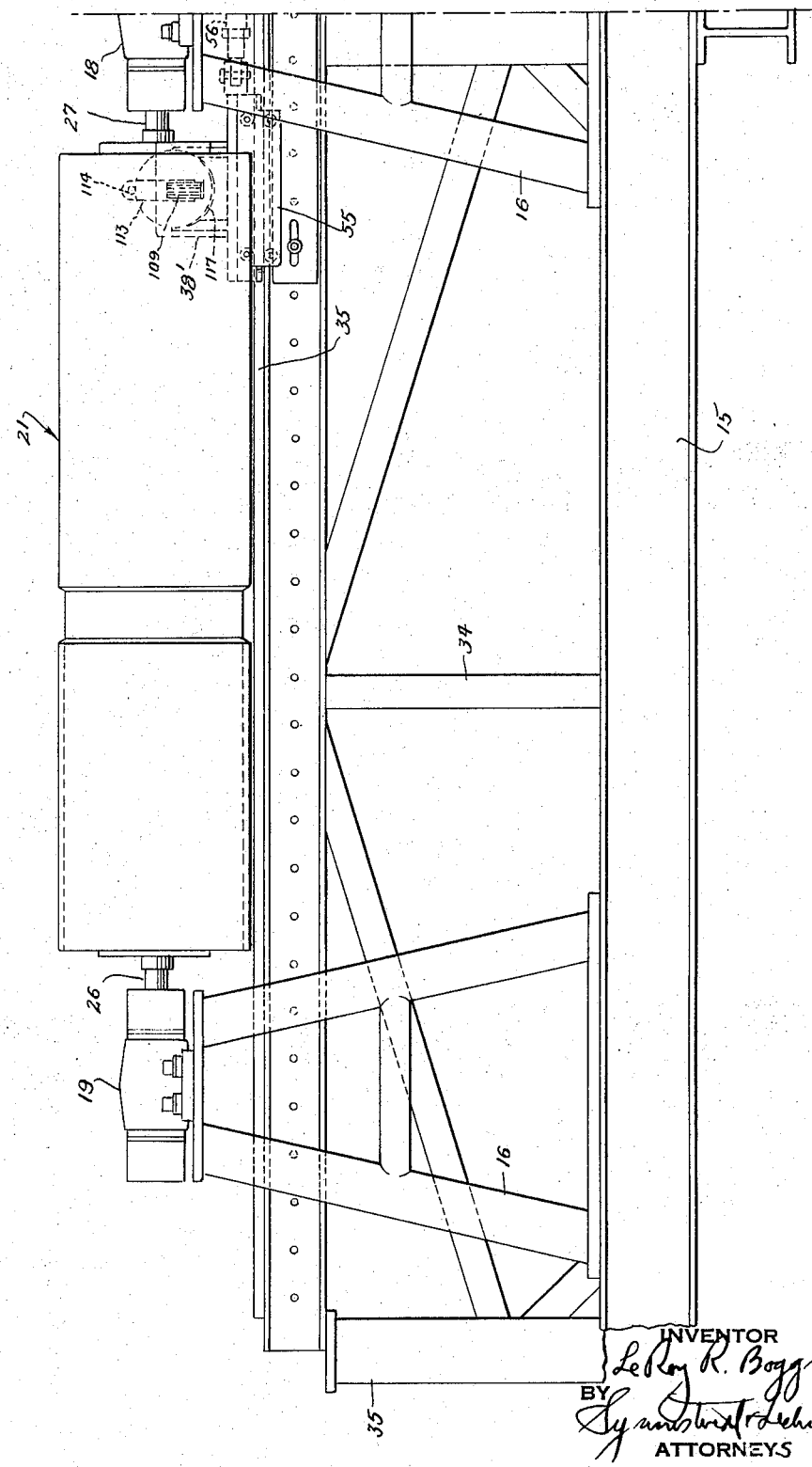

INVENTOR
LeRoy R. Boggs
BY
ATTORNEYS

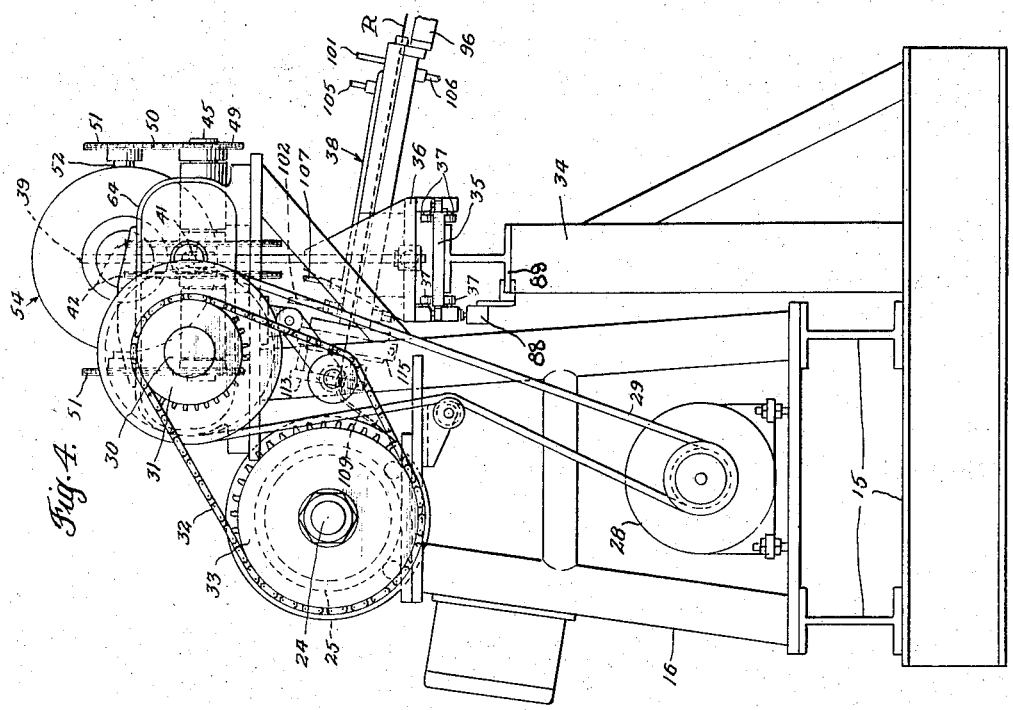
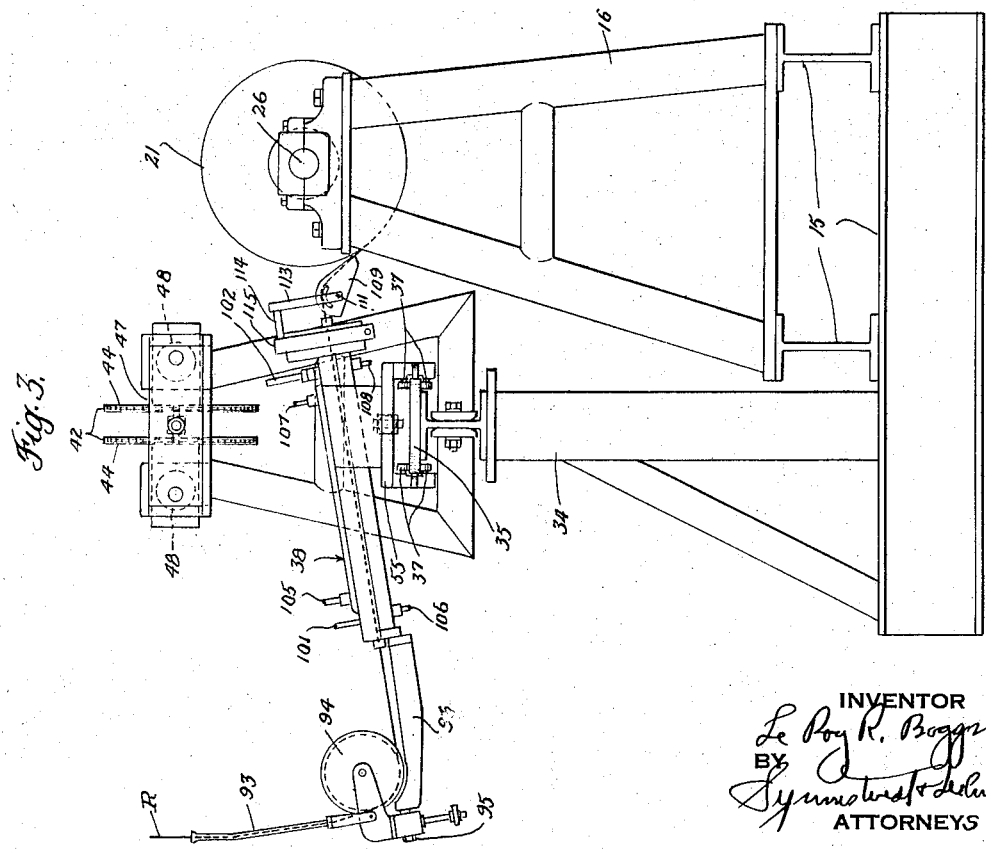

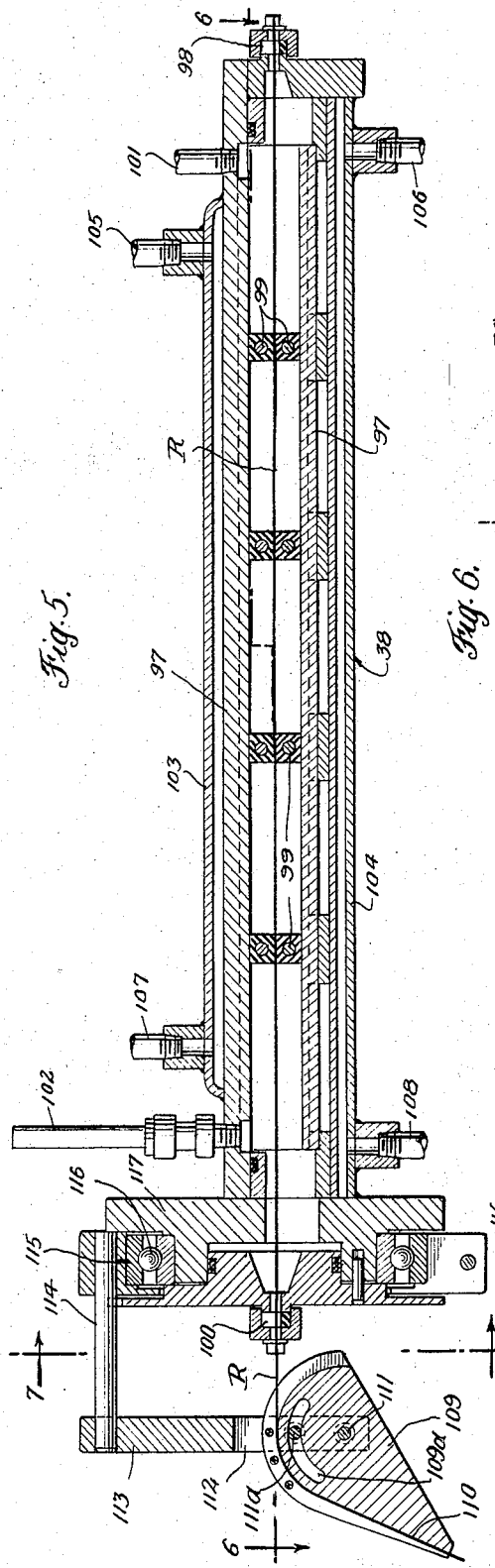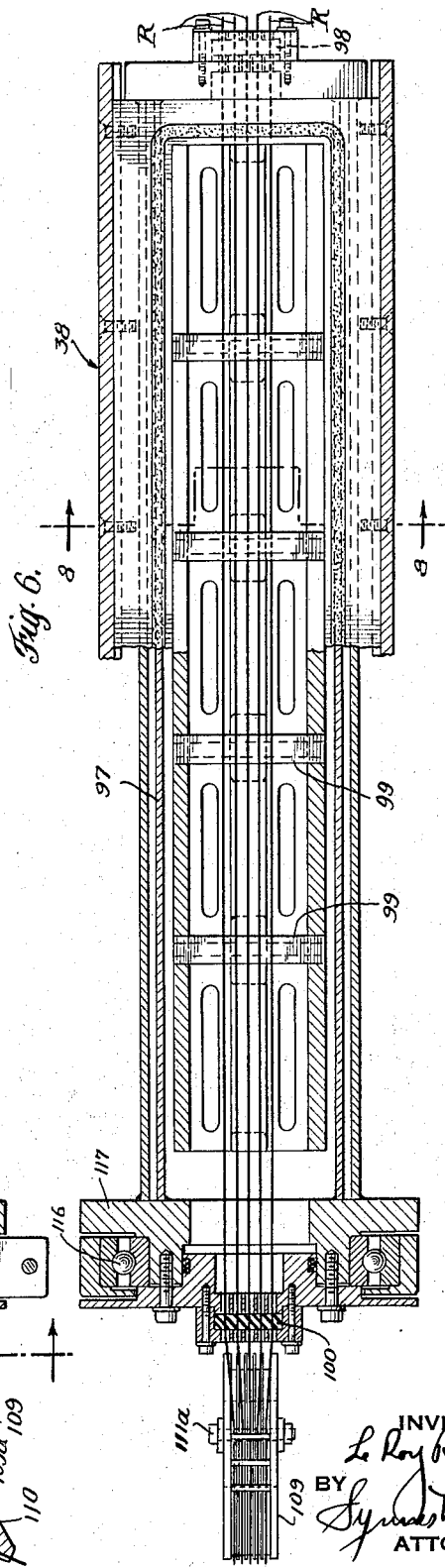

March 7, 1967 LE ROY R. BOGGS 3,307,998

FILAMENT WINDING EQUIPMENT

Filed Sept. 18, 1962 9 Sheets-Sheet 7

INVENTOR
Le Roy R. Boggs
BY
ATTORNEYS

March 7, 1967  LE ROY R. BOGGS  3,307,998
FILAMENT WINDING EQUIPMENT
Filed Sept. 18, 1962  9 Sheets-Sheet 8

| POSITION # | 5 | 4 | 3 | 2 | 1 | 12 | 11 | 10 | 9 | 8 | 7 | 6 |
|---|---|---|---|---|---|---|---|---|---|---|---|---|
| OUTPUT R.P.M. | 2048 | 4096 | 2 | 4 | 8 | 16 | 32 | 64 | 128 | 256 | 512 | 1024 |

INVENTOR
Le Roy R. Boggs
BY
ATTORNEYS 3,307,998
FILAMENT WINDING EQUIPMENT
Le Roy R. Boggs, Bristol, Tenn., assignor to Universal
Moulded Fiber Glass Corp., Bristol, Va., a corporation
of Delaware
Filed Sept. 18, 1962, Ser. No. 224,472
11 Claims. (Cl. 156—361)

This invention relates to filament winding equipment and is particularly concerned with equipment of this type adapted to wind resin impregnated filaments, especially glass fiber rovings, on a mandrel in order to build up a cylindrical article, such as a pressure vessel or tank. The invention is useful in connection with either open end hollow articles or in connection with articles having closed ends, which may be produced, for example, by incorporating end closures in the mandrel structure on which the filaments are wound, such end closures ultimately constituting permanent parts of the article formed.

Although, as above indicated, the invention contemplates winding of resin impregnated filaments, in certain of its broader aspects, the invention is also useful in the winding of filaments or the like which are not resin impregnated, at least prior to the winding operation. In producing articles of various kinds, filaments or even ribbons of various types may be employed, although the invention is particularly suited to the handling of glass fiber rovings which, because of the brittle character of the individual glass filaments, presents certain special problems in handling. It is also here pointed out that in a typical operation according to the invention, where the filaments are impregnated with a resin material, the resin may comprise a thermosetting or heat hardenable resin, preferably of the polyester type. Epoxy resins may also be employed.

In a typical operation according to the invention, the impregnated filaments such as the glass fiber rovings are wound upon the mandrel in the filament winding equipment or machine, and the mandrel is removed from the machine with the winding thereon and heat is applied to the winding in order to set or cure the resin and thus harden or solidify the article being formed. This latter operation constitutes no part of the present invention per se but it may be here noted that it may be accomplished either by heating the mandrel itself, for instance by passing steam through the mandrel, or by placing the mandrel with the winding thereon into a curing oven. After curing, the mandrel and the formed article may be separated, for example in the case of a cylindrical article, by forcing the article off one end of the mandrel.

With the foregoing general field of the invention in mind, it is now pointed out that among the more important objects of the invention are following:

In one aspect of the invention, it is an object to provide a filament traverse mechanism, i.e., the mechanism which causes the filament as it is fed to the mandrel to shift its position axially of the mandrel, which traverse mechanism effects a gradual rather than an abrupt or "shock" type reversal at the ends of the traverse reciprocations. More specifically, the invention provides harmonic reversal of the motion at the ends of the traverse strokes, i.e., a reversal motion of constant acceleration.

The traverse mechanism according to the invention also provides for constant traverse speed during the portion of each stroke intermediate the reversal motions at the ends of the stroke, with positive synchronization of such speed and such reversals with the rotational speed of the mandrel.

The traverse mechanism of the present invention further makes possible accurate reproduction of desired filament winding patterns from layer to layer in a given article, and also from article to article in a given production run.

It is a further object of the invention to provide for tandem interconnection of certain machine parts, including mandrels and filament traverse guides, whereby articles may be produced in multiple, simultaneously in a given machine.

In accordance with another aspect of the invention provision is made for regulating the traverse motion in relation to the rotation of the mandrel in such manner as to provide for the winding of filaments at any precisely selected helix angle throughout an exceedingly broad range of such angles, and to accomplish this by means of novel and highly effective speed change mechanism incorporated in the drive system of the traverse mechanism.

This invention also provides new and improved mechanism for handling, impregnating and feeding filaments, especially glass fiber rovings, from a source of supply to the mandrel, the guides being so arranged as to direct the roving in a substantially radial direction toward the axis of rotation of the mandrel to a point in close proximity to the circumference or periphery of the mandrel, and then to guide the filament or roving from that point tangentially and at the selected helix angle to the surface of the mandrel. In this way accuracy of feed and thus of development of the desired winding pattern is enhanced.

The filament feed and impregnating mechanism is further arranged to provide for substantially straight line feed of the filament, for instance glass fiber roving, throughout a substantial portion of its travel, including travel through the impregnating means, thereby minimizing turns or deflections such as have a tendency to damage filaments, especially glass fiber rovings.

Still another object of the invention is to provide for the concurrent handling and feed of a plurality of filaments or rovings simultaneously and to lay the plurality of filaments or rovings onto the mandrel in the form of a ribbon in a helical path and thereby increase production rate with given equipment.

Another object of the invention is to provide a resin impregnation system for the filaments arranged to effect thorough impregnation with minimum damage to the filaments or rovings, the resin system also being conveniently arranged in a novel manner for maintenance of a proper supply of the resin in the system at a proper temperature.

How the foregoing and other objects and advantages of the invention are obtained will be clear from the following description referring to the accompanying drawings illustrating a preferred embodiment of the equipment according to the invention, and in which:

FIGURES 1a and 1b taken together comprise a front elevational view of a multiple filament winding machine constructed according to the present invention;

FIGURE 2 is a broken out plan view on an enlarged scale as compared with FIGURES 1a and 1b, illustrating much of the apparatus shown in FIGURE 1b and a small portion of the apparatus appearing in FIGURE 1a;

FIGURE 3 is an end elevational view taken from the left of FIGURE 1a, looking toward the right;

FIGURE 4 is a view similar to FIGURE 3 but taken from the right of FIGURE 1b, looking toward the left;

FIGURE 5 is a vertical sectional view of the fiber or filament impregnating and feeding mechanism;

FIGURE 6 is a plan sectional view of the apparatus of FIGURE 5, with certain parts omitted for the purpose of illustrating others lying below;

Figure 1B:
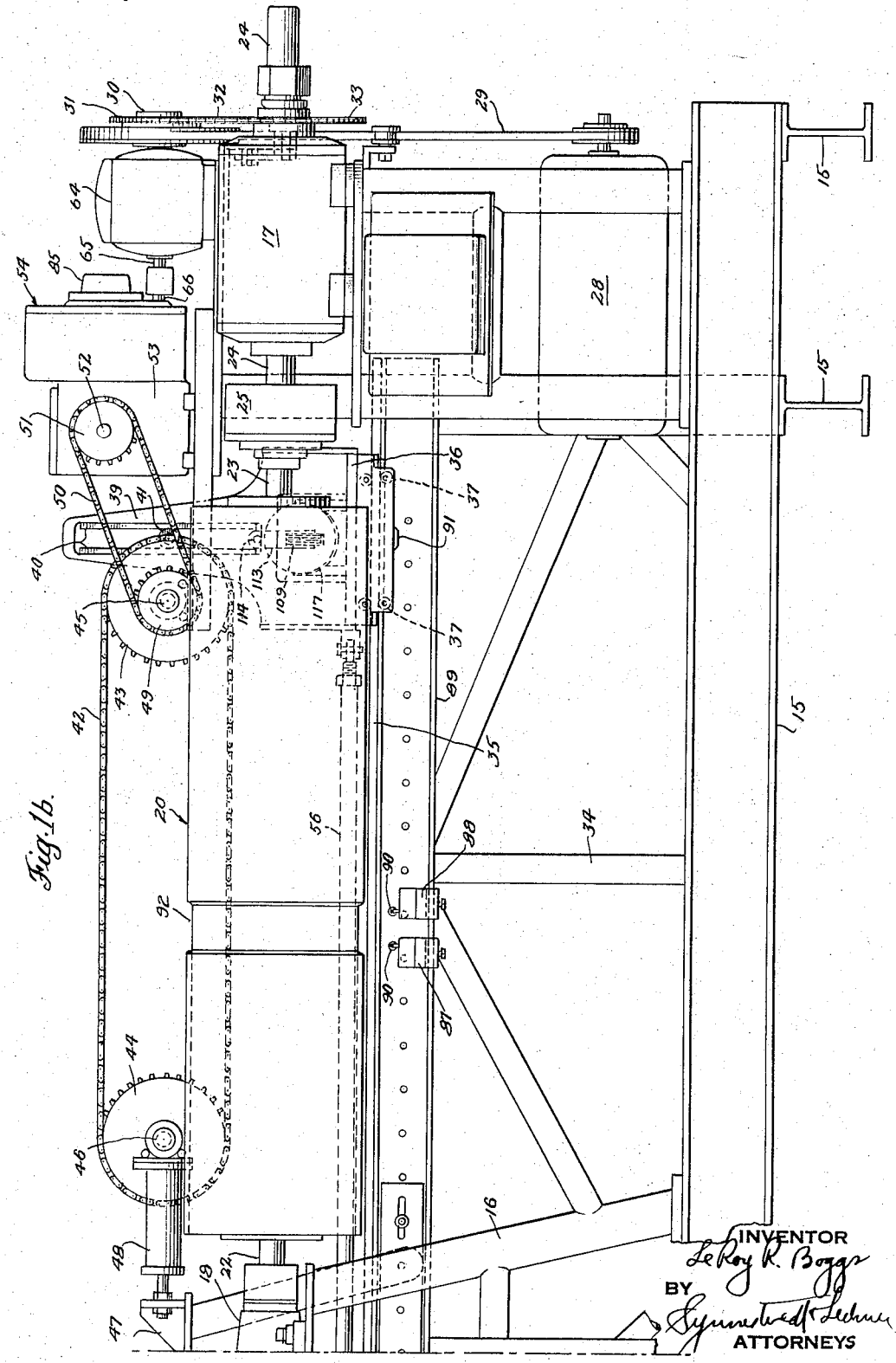

While as above indicated, the invention is applicable to filament winding operations of a variety of types, for purposes of illustration and description herein it is assumed that the equipment illustrated in the drawings is to be employed for the production of cylindrical articles having an internal rib, and that the materials used to form that article comprise a plurality of glass fiber rovings and an epoxy type resin material which is initially in liquid phase but which is capable of being hardened or cured by application of heat after the article is formed.

With the foregoing in mind, attention is now directed to the general arrangement of the equipment as illustrated particularly in FIGURES 1 to 4 inclusive.

In the front elevational view of FIGURES 1a and 1b it will be seen that the apparatus is built up upon base frame members 15. Supports 16 projecting upwardly from the base frame members serve to mount journals or bearings 17, 18 and 19 provided for rotatively mounting mandrels on which the articles are to be formed. In FIGURE 1b such a mandrel appears at 20, and another such mandrel appears at 21 in FIGURE 1a. The mandrel 20 has mounting shafts 22 and 23 projecting at its ends, the shaft 22 being journaled in the bearing 18 and the shaft 23 being connected with a shaft 24 through the mandrel mounting chuck 25, the shaft 24 in turn being carried by the bearings 17. The mandrel 21 has mounting shafts 26 and 27 projecting at its ends, the shaft 26 being mounted by the bearing 19 and the shaft 27 being mounted by the bearing 18 and being connected with the shaft 22 so that the two mandrels rotate together. Indeed both mandrels are driven through the shaft 24 at the right hand end of FIGURE 1b by drive mechanism described herebelow, but it is first pointed out that additional mandrels may be arranged beyond, i.e., to the left of the bearing 19 in FIGURE 1a, so that any desired number may be arranged in tandem and driven from a common power source.

As best seen in FIGURES 1b and 4, the power drive for the mandrels includes a motor 28 which is preferably variable as to speed, the motor being connected through a driving belt 29 with a shaft 30 also carrying a sprocket 31 which is connected by means of chain 32 with a sprocket 33 mounted on the mandrel driving shaft 24.

The main base frame structure 15 also serves to mount the filament traverse mechanism parts of which are carried by upright supports 34 (see FIGURES 1, 3 and 4). This traverse mechanism includes a trackway 35 on which the traverse carriage 36 may travel back and forth axially of the mandrel 20, carriage rollers 37 providing for free rolling action of the carriage on the trackway. Carriage 36 serves to mount the resin box 38 in which the rovings to be wound on the mandrel are impregnated. Associated with the resin box 38 are various filament guide and feed devices to be described more fully herebelow, but before that description reference is made to the drive system for the traverse mechanism, i.e., the transmission elements providing for imparting the reciprocating motion to the carriage 36 and thus to the resin box 38 and other guide devices carried therewith.

Figure 2:
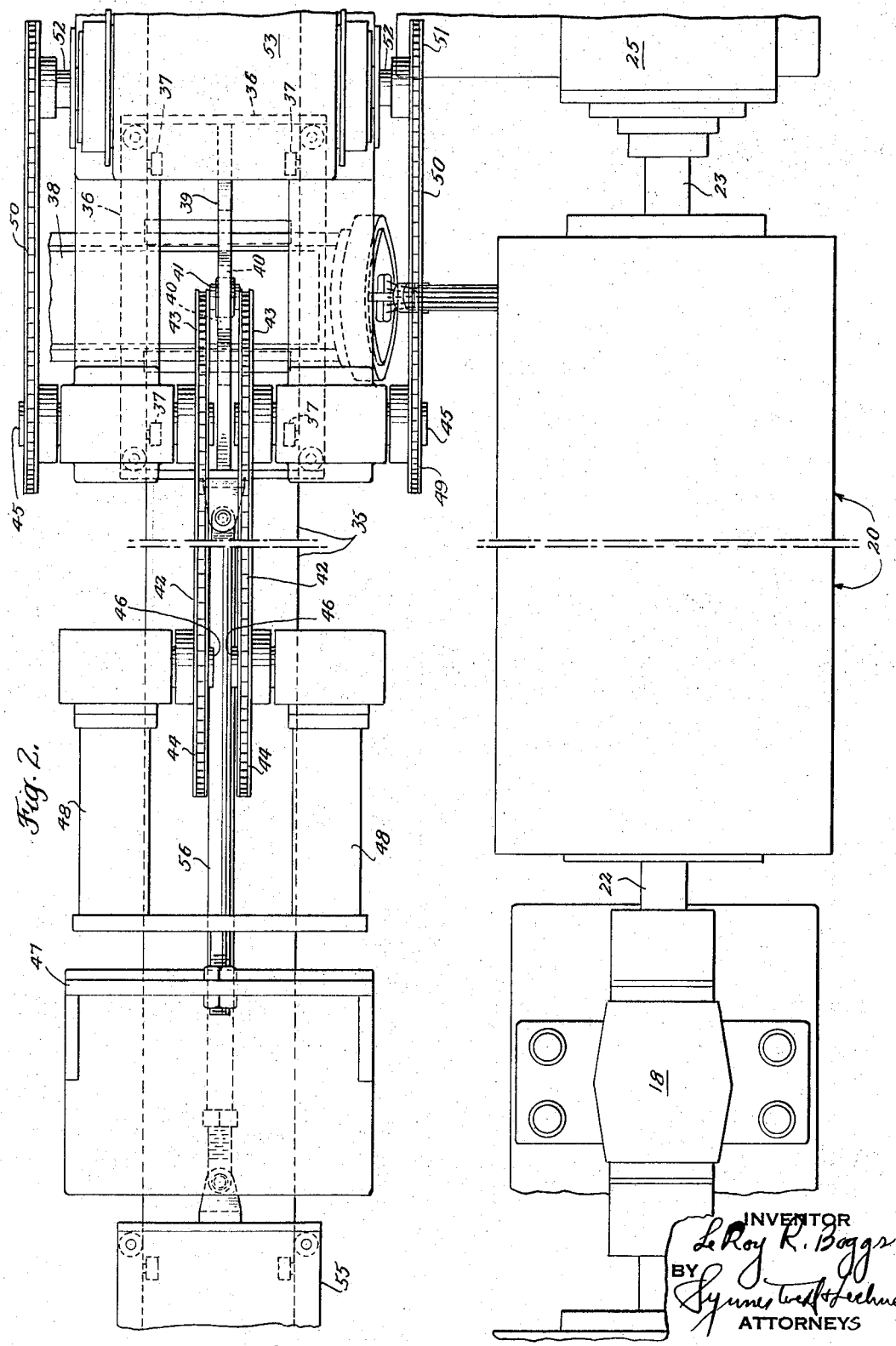
Figure 7:
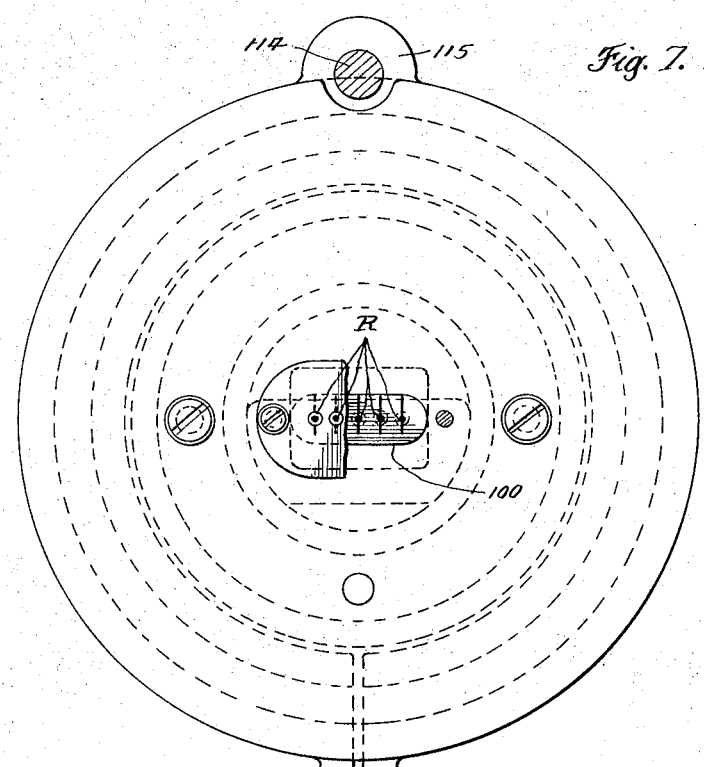
FIGURE 7 is an enlarged elevational view taken as indicated by the line 7—7 on FIGURE 5.

As best seen in FIGURES 1b and 2, the carriage 36 projects upwardly above the trackway 35 and is provided with a yoke 39 having opposed vertical trackways 40 therein adapted to cooperate with a roller 41. The roller 41 is carried by a shaft extended between a pair of chains 42, each of which rides on a pair of sprockets 43–44. The sprockets 43 are mounted on separate shafts 45, and sprockets 44 are similarly mounted on separate shafts 46, thus providing clearance between the mounting shafts to accommodate reciprocating motion of the yoke 39 from one end of the chains 42 to the other end thereof. The motion of the chains is transferred to the upright yoke 39 of the carriage 36 through the roller 41, which roller moves upwardly and downwardly between the guideways 40—40 as the roller 41 passes around the circumference of the sprockets 43 and 44. This provides a reciprocating traverse motion with a reversal motion at each end having constant acceleration, as will be described more fully herebelow.

The sprockets 44 are conveniently idling sprockets, and their shafts 46 are mounted on frame structure 47 by means of adjustable devices 48 by which the position of the shafts 46 may be shifted toward or away from the shafts 45 for the sprockets 43 at the opposite end of the chain system. In this way provision is made for altering the length of the chains used and thus the length of the traverse structure when it is desired to alter the length of the piece to be made.

The sprockets 43 are adapted to be driven, thereby driving the chains 42, by means of additional sprockets 49 carried on the shafts 45 and cooperating with chains 50 which receive power from sprockets 51 mounted on a common shaft 52 the ends of which project from the casing part 53 of the transmission mechanism generally indicated at 54 and shown in greater detail in FIGURES 9 to 12.

In the foregoing manner power is delivered from the transmission unit 54 to the chains 42 which effect the reciprocating traverse motion of the carriage 36, this carriage serving to mount the resin box 38 and the associated filament guiding and feeding devices to be described. A similar resin box 38 and similar filament guide and feeding devices are mounted on another carriage 55 also adapted to ride upon the trackway 35, the carriage 55 being arranged to have traverse motion in relation to the second mandrel 21. The carriage 55 is linked to the carriage 36 by the push-pull rod 56 which serves to transmit the traverse or reciprocating motions from the first carriage to the second. Similarly in the event of inclusion of additional mandrels, additional carriages will be provided in which to mount the resin boxes and guide mechanisms required for the additional mandrels and all of those carriages will be operated in tandem from a common source of power.

For certain purposes to be brought out more fully hereinafter, the shaft 52 carrying the sprockets 51 (one end of such shaft being fully shown toward the right of FIGURE 11) is arranged to be coupled with drive mechanism within the casing 53 alternatively through controllable clutches indicated at 57—57. In this way shaft 52 is adapted to be connected either to shaft 58 carrying a bevel gear 59 or to shaft 60 carrying a bevel gear 61, the two bevel gears 59 and 61 both meshing with the bevel gear 62 mounted on the output shaft 63 of the change speed gearing described below. The arrangement of the gearing 59, 61 and 62 and of the clutches 57 provides for rotation of the shaft 52 in either direction with reference to the direction of rotation of the shaft 63, for purposes which will further appear.

Figure 9:
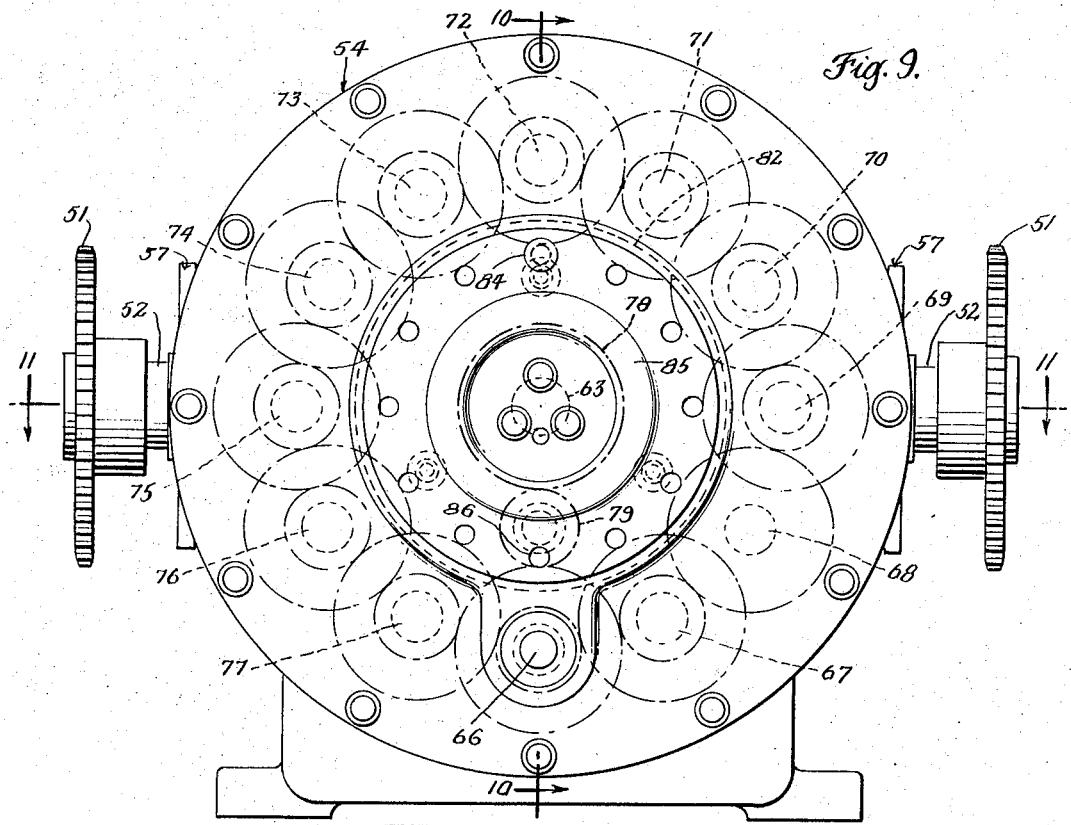
FIGURE 9 is an elevational view of a portion of the drive system for the traverse mechanism.

Turning now to the power transmission system ahead of the output shaft 63, it is first noted that power for this transmission is also derived from the motor 28 (see FIGURES 1b and 4), power being transmitted through the belt 29 to the shaft 30 constituting an input shaft for power delivered to the speed reducer 64 of any known type which need not be considered in detail herein, preferably one providing for infinite speed reduction between a 1:1 ratio and a 2:1 ratio. The output shaft 65 of the speed reducer 64 is connected with the input shaft 66 of the change speed transmission 54 (see FIGURE 1b), the details of which appear in FIGURES 9 to 12. In FIGURE 9 it will be seen that the input shaft 66 of the transmission 54 is positioned in parallel spaced relation to the output shaft 63. A series of additional shafts 67 to 77 are similarly arranged in spaced parallel relation to the output shaft 63 and in a ring surrounding the output shaft, as appears in FIGURE 9, and each of the shafts 66 to 77 inclusive is provided with a pair of gears one of which is of larger diameter than the other. These gears and their arrangement appears to best advantage in FIGURE 12 which shows a developed view of the shafts and gears of this transmission unit, i.e., a representation of the shafts and gears as though they were laid out flat instead of mounted in a ring surrounding the output shaft 63.

Figure 10:
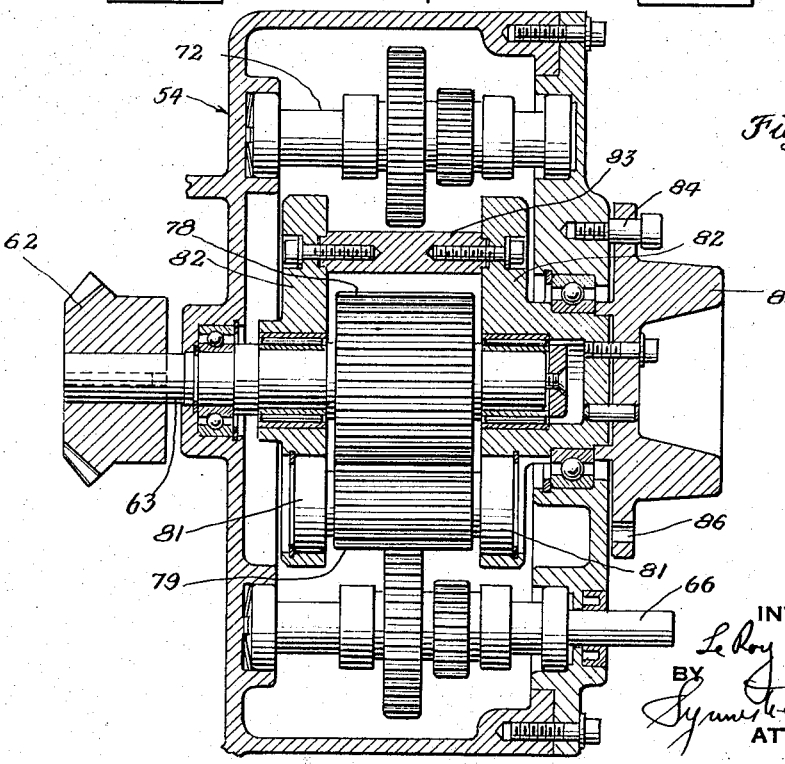
FIGURE 10 is a vertical sectional view taken as indicated by the line 10—10 on FIGURE 9.
Figure 11:
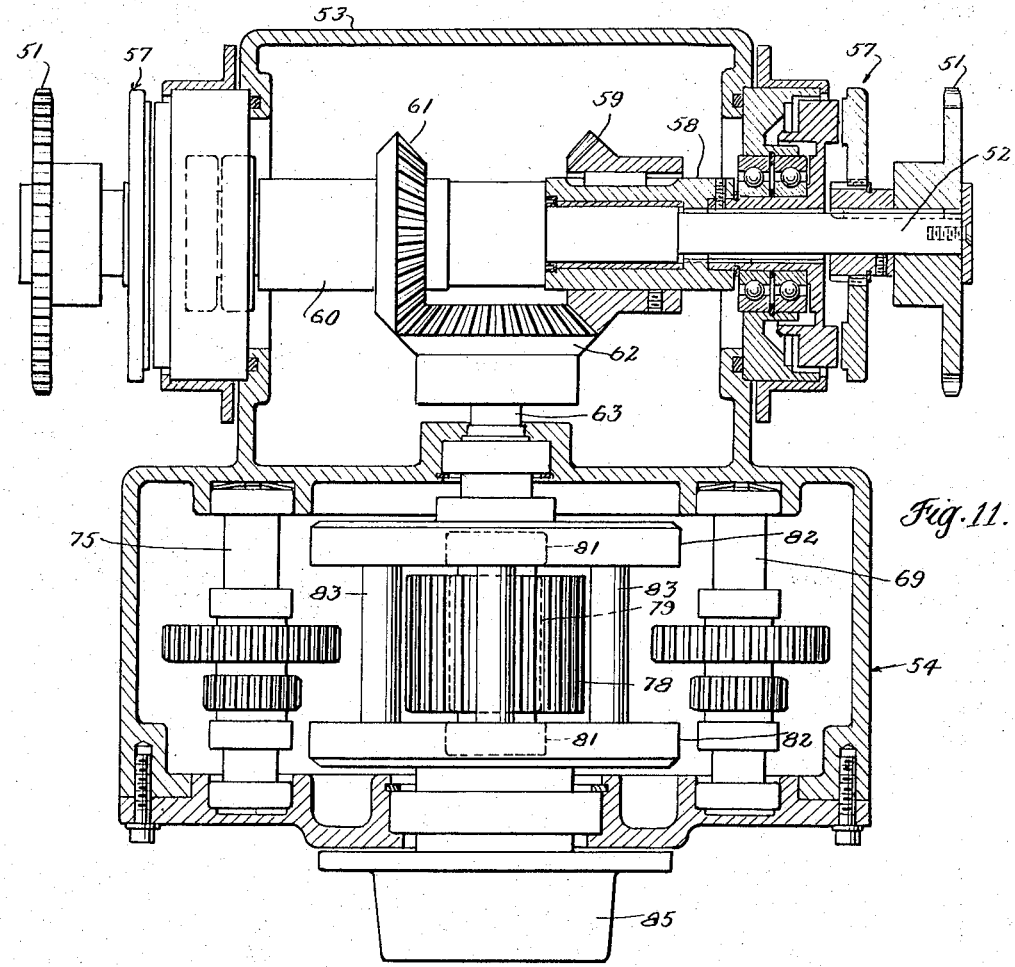
FIGURE 11 is a plan sectional view taken as indicated by the line 11—11 on FIGURE 9.
Figure 12:
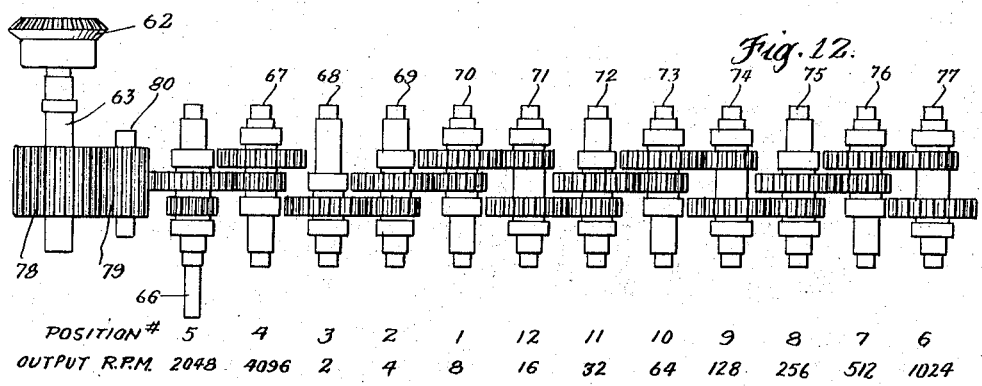
FIGURE 12 is a developed view of the change speed gear train included in the device shown in FIGURES 9, 10 and 11.

As clearly seen in FIGURES 10, 11 and 12, each of the shafts 66 to 77 is provided with two gears, one of which is of larger diameter than the other. The larger diameter gear on one shaft meshes with a smaller diameter gear of an adjacent shaft in the series. For example, referring to FIGURE 12, the larger diameter gear on shaft 68 meshes with the smaller diameter gear on shaft 69, the larger diameter gear on shaft 69 meshes with the smaller diameter gear on shaft 70, and so on to the end of the series shown at the right of FIGURE 12. With respect to shaft 77 which appears at the right of FIGURE 12, the large diameter gear of that shaft meshes with the small diameter gear on shaft 66 which appears at the left end of the developed view of FIGURE 12, and the large diameter gear on shaft 66 meshes with the small diameter gear on shaft 67. The large diameter gear on shaft 67 does not mesh with a small diameter gear on any other shaft but is provided for a purpose to be explained.

The output shaft 63 which is arranged at the center of the ring of shafts 66 to 77 carries a broad gear or pinion 78 meshing with a similar but smaller diameter gear 79 carried by a shaft 80, which shaft is journaled as at 81—81 (see FIGURE 10) in the discs 82—82 which are mounted for rotation on the central output shaft 63, the discs being interconnected by cross connections 83 providing a cage by means of which the gear 79 may be adjusted in position in the manner of a planet about the axis of the central shaft 63. The gear 79 may thus be positioned to intermesh with any one of the larger diameter gears provided on shafts 66 to 77 and the central gear 78 provided on the output shaft 63. In this way power may be delivered from any one of shafts 66 to 77 to the gear 78, thus transmitting power to the output shaft 63 and through the gear 62 to one or the other of gears 59 and 61, depending upon which of the two clutches 57 is engaged, the power thus being delivered to the shaft 52 and ultimately to the traverse chains 42.

The cage 82—82, 83 for mounting the planet gear 79 may be adjusted to any desired position (see FIGURE 10) by removing the fastening bolt 84 and turning the projecting handle or knob 85 to bring another one of the apertures 86 provided in the knob flange into position to be secured in alignment with the aperture with which the bolt 84 cooperates. The flange of the knob 85 is provided with a series of apertures 86, one corresponding to each of 12 positions of adjustment which provide for engagement of the planet gear 79 on the larger diameter gear on each one of the shafts 66 to 77.

This gear selection mechanism makes possible wide variation of speed reduction. Specifically, with smaller and larger gears on the shafts 66 to 77 providing a 2:1 ratio, the adjustments provide for variation of the speed reduction in steps, as follows:

First, for purposes of identification, the several selection positions are marked below FIGURE 12 as positions numbers 1 to 12.

Assuming an input r.p.m. at the input shaft 66 of 2,048 r.p.m., then with the selector gear 79 in position number 5, i.e., in engagement with the large gear of the input shaft 66, output r.p.m., i.e., the r.p.m. of shaft 63, will be the same as the input r.p.m., namely 2,048. This is a 1:1 ratio between the input and output.

Next consider the selector gear 79 at position number 4. In this instance the gearing between the input shaft and the shaft 67 at position number 4 is a step-up, rather than a step-down. Therefore with the input shaft r.p.m. at 2,048, the r.p.m. of the output shaft 63 will be 4,096.

All of the other selection positions provide step-down in speed from the input to the output. For example, at selection position number 6 in which the selector gear 79 engages the large gear on shaft 77, for the input r.p.m. of 2,048, the output r.p.m. will be 1,024. With regard to this particular station as illustrated at the right hand end of FIGURE 12, it will be understood that the large diameter gear on shaft 77 is in constant mesh with the small diameter gear on the input shaft 66.

As another example, consider the selector gear 79 at position number 7. Here there is another 2:1 reduction so that for an input r.p.m. of 2,048 the output r.p.m. will be 512. Similarly, still further 2:1 reductions occur if the selector gear is moved to positions 8, 9, 10, 11, 12, 1, 2 and 3, until at position number 3 the output r.p.m. will be 2 for an input r.p.m. of 2,048, or an input to output ratio of 1,024 to 1.

It may be observed that the large diameter gear on shaft 67 does not mesh with a small diameter gear on its neighboring shafts at either side. This gear, however, is provided for engagement with the selector gear when it is moved to position number 4.

With the 2:1 infinite variation in speed reduction provided by the speed reducer 64, in combination with the step-wise reductions available by virtue of the transmission unit 54, infinite variation is made possible in the speed reduction throughout the entire range of adjustment.

Attention is now directed to the fact that when the selector gear 79 is shifted from one position to an adjacent position, the direction of rotation of the output shaft 63 will be reversed for a given direction of the input shaft 66. With any such adjustment however the clutches 57—57 in the reversing mechanism may be used to provide any particular direction of motion transmitted to the traverse chains 42. In any event when employing the traverse mechanism including the roller 41 riding between the tracks 40—40 for effecting the reciprocation of the carriages such as indicated at 36, it is not of consequence which direction of motion is imparted to the shaft 52 and thus to the chains 42, as this mechanism will function in exactly the same manner with either direction of rotation. However, the capability of reversing the direction of rotation of the shaft 52 (by means of alternative or alternating use of the clutches 57) is a feature of importance in connection with a contemplated alternative mode of operation of the equipment, now to be described.

Referring to FIGURE 1b it will be seen that limit switches 87 and 88 are mounted on the flange 89 of the support structure for the carriage trackway 35, these limit switches being shiftable to any desired location along the length of the carriage travel. Each limit switch is provided with a projecting actuator adapted to be engaged by the striker 91 projecting downwardly from the carriage 36. The limit switches when positioned within the limits of the stroke provided by the traverse drive mechanism already described, for instance in positions such as shown in FIGURE 1b, may be used to provide a short carriage stroke in order to build up a localized winding at any time during the production of an article. For this purpose the limit switches are connected with operating mechanisms for the clutches 57, thereby providing for alternate actuation of those clutches and thus for alternate drive of the shaft 52 in one direction and then in the other direction.

A localized build up of the filament winding may for example be desirable in combination with a mandrel of the type illustrated in FIGURE 1b at 20, in which at a point intermediate the ends of the mandrel, a groove 92 is provided, in order to define an interior enlargement or reinforcement upon a cylindrical article being formed. In such an operation the limit switches are set so as to effect reversal in the direction of drive of the chains 42 at the ends of a short stroke corresponding to the axial length of the groove 92 in the mandrel. Upon filling the groove 92 with appropriate windings, the limit switches may be disabled or removed, whereupon the full length traverse will occur under the influence of the continuous uni-directional movement of the traverse chains 42.

Attention is now directed to the filament handling, feeding and impregnating system of the apparatus, and it is first pointed out that the preferred arrangement of the equipment of the invention provides for the concurrent or simultaneous impregnating and feeding of a plurality of filaments, such as the glass fiber rovings hereinbefore mentioned. It is assumed that a plurality of spools of such rovings, for instance five of them, are suitably mounted at some convenient point above the apparatus shown at the left side of FIGURE 3. One such filament or roving appears at R in that same figure and it will be seen that the roving R passes downwardly through a guide tube 93 and thence to a groove on the guide pulley 94 mounted on a generally horizontal swivel 95 so that the pulley may change its inclination with respect to a vertical plane as the feed mechanism traverses or reciprocates with respect to the supply spools during operation. The roving passes from the guide pulley 94 to the resin impregnating box 38. The roving R entering the box 38 also appears at the right hand side of FIGURE 4 and in FIGURE 6, five such rovings are seen to be entering the right hand end of the resin box 38. It is contemplated that suitable guide elements such as indicated at 93, 94 and 95 will be provided for each of the rovings being fed, the several sets of such elements being mounted in spaced relation on a bracket structure 96 projecting outwardly from the outer end of the resin box 38.

From FIGURES 5 to 8 the construction of the resin box will be clear. Thus the box includes inner walls 97 defining an elongated and closed chamber through which the rovings pass in side-by-side relation. The rovings enter this box through a squeegee or resilient packing 98 which prevents loss of resin from the entrance end of the box. Within the box the rovings pass between resilient, preferably rubber pressing or squeegee elements 99 arranged in pairs and serving as an aid to effectively impregnate the rovings with the resin contained in the box. At the exit end of the box toward the left in FIGURES 5 and 6 the rovings again pass through a resilient packing device shown at 100 to prevent loss of resin at that point. Resin is supplied to the resin box through the supply line 101, and toward the opposite end of the resin box a vent tube 102 is provided, preferably formed of glass, for a purpose mentioned herebelow.

Figure 8:
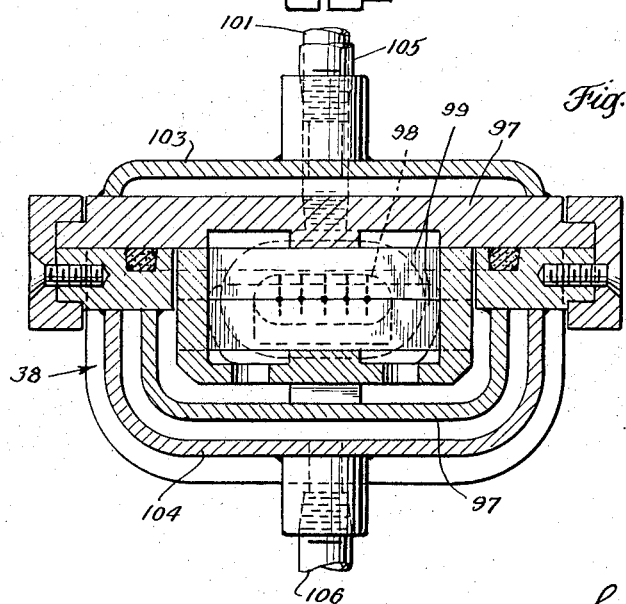
FIGURE 8 is a similarly enlarged transverse sectional view taken as indicated by the line 8—8 on FIGURE 6.

As best seen in FIGURES 5, 6 and 8, the resin box is split horizontally into two parts for convenience of opening and closing for purposes of threading the rovings therethrough and each part is jacketed, as indicated at 103 and 104 to provide for circulation of a heat transfer medium at the walls of the resin box, for instance hot water, for which purpose inlets 105 and 106 are provided as well as outlets 107 and 108. With a typical epoxy type resin, the resin is warmed somewhat, to a point shortly below its critical setting temperature in order to maintain the resin in a relatively fluid condition and thus facilitate impregnation of the rovings notwithstanding the fact that the rovings are fed through the resin box in a substantially straight line path. In this way the invention avoids using labyrinth type squeegee or guide elements causing the rovings to deflect from one path to another within the resin reservoir, and the absence of such labyrinth type elements is of advantage when handling glass fiber rovings, the filaments of which are highly subject to breakage upon flexure. With a typical epoxy resin the temperature of the resin is maintained for instance in the range from about 100° to 150° F.

At the exit end of the resin box, the rovings are passed over the curved surface of a guide device 109, the guide device having grooves maintaining the several rovings being fed in side-by-side relation, generally in the shape of a ribbon. The guide device also has a straight guide portion 110 from which the rovings are ultimately delivered to the mandrel, for instance the mandrel 21 shown in FIGURE 3. The guide device 109 is pivotally mounted at 111 to the lower fork members 112 carried by a support 113 which is mounted by a pin 114 on the outer race 115 of a bearing 116 which bearing is mounted on the delivery end of the resin box, as by a bracket 117. The bearing 116 is preferably arranged generally concentrically of the path of feed of the rovings through and out of the resin box, in view of which the curved surface of the guide 109 with which the rovings engage shortly after delivery from the resin box also has a motion about an axis concentric with the straight line feed path of the rovings through the box and out of the discharge end of the box.

The pivotal mounting of the guide 109 is of advantage and importance in providing accuracy of filament feed in the desired filament winding pattern. The resin box with the guide 109 mounted thereon (see FIGURE 3) is preferably positioned so that the straight line feed path of the rovings through and from the box is inclined upwardly toward the mandrel on which the rovings are to be wound. Most advantageously, the box with the guide 109 carried thereby is positioned so that the straight line feed path and also the axis of the bearing 116 intersects the axis of rotation of the mandrel, the guide also being positioned very close to the surface of the mandrel. When arranged in this manner, during the traverse motion, the guide 109 will oscillate about its mounting bearing 116, first in one direction and then in the other to an extent corresponding substantially to the pitch angle at which filaments are being laid upon the mandrel. In order to provide the desired relationship between these parts, the resin box is preferably adjustably mounted on the traverse carriage, for instance the carriage 55 shown in FIGURE 3, or the carriage 36 shown in FIGURE 4, these carriages being provided for cooperation respectively with the mandrel 21 and the mandrel 20. The adjustable mounting provides for shifting of the position of the resin box toward and away from the mandrel supporting means, so that when mandrels of different sizes are used, the resin box and the guide carried thereby may be adjusted to a position in close proximity to the mandrel.

The guide device 109 is adjustable about its pivot mounting 111, for instance by a clamp screw 111a extended through an arcuate slot 109a, providing for angular motion of the guide 109 about the axis of the pin 111, thereby permitting adjustment of the straight line part 110 to bring that part into a position of substantial tangency with respect to the circumference of a mandrel of any size employed in the machine.

It will be understood that a resin box and roving or filament feeding and guiding mechanisms of the kind described are provided for each of the mandrels to be incorporated in the equipment.

Figure 13:
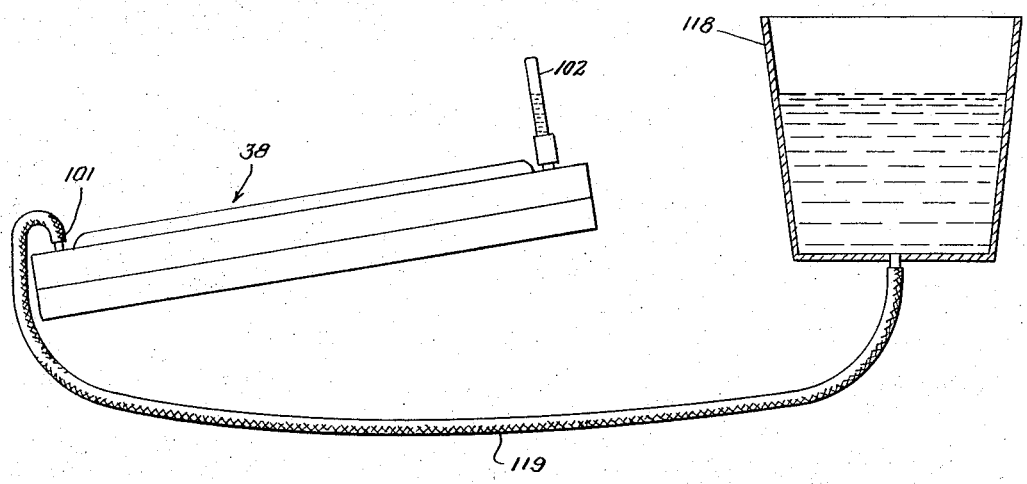
FIGURE 13 is a somewhat diagrammatic or outline view illustrating certain parts of the resin supply system.

Since the resin box partakes of the reciprocation or traverse motion, the connections to the box for heat transfer medium and also for resin supply desirably include hoses or other flexible lines. In the case of the resin supply it is preferred to use a resin supply system of the type illustrated somewhat diagrammatically in FIGURE 13. Here it will be seen that a supply tank or reservoir 118 is provided, this being mounted on any suitable fixed part and the lower portion of it being connected through the flexible hose 119 to inlet 101 for the resin box 38. The vessel 118 is preferably open so as readily to be filled with a fresh supply. The vessel 118 is also so located vertically in relation to the location of the resin box 38 and its glass vent tube 102 that the level of the resin in the vessel 118 will also appear in the glass tube 102. Thus the tube 102 serves not only for venting the resin box, which is desirable in order to eliminate air brought into the resin box between the fibers of the rovings but also serves as a gauge glass to indicate whether the resin box is full of liquid resin, as is contemplated.

In considering certain of the advantages and operational features of the equipment described above, it is first pointed out that the drive system for the mandrels and traverse mechanisms is completely interrelated and positively synchronized, although a wide variation in settings of the traverse drive mechanism is provided for. Because of this the equipment may be set to provide a helix angle in the winding operation which is either large, i.e., of low pitch, or which is small, i.e. of high pitch.

Moreover, the overall speed of both the mandrels and the traverse mechanisms may be readily be adjusted by changing the operating speed of the variable speed motor 28.

Figure 14:
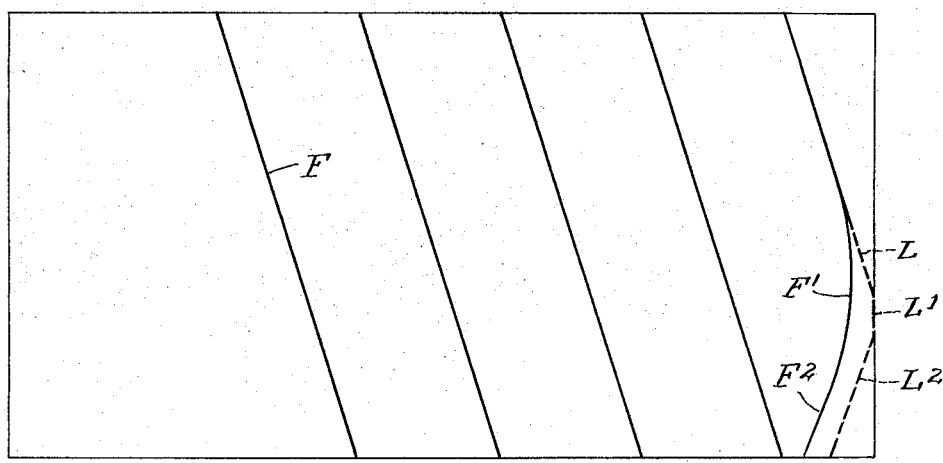
FIGURE 14 is a developed view of certain filament winding patterns and illustrating certain features of the invention.

The arrangement of the traverse chains 42, and the actuating roller 41 cooperating with the guide tracks 40 provides for harmonic reversal at the ends of the traverse strokes, such harmonic reversal being characterized by constant acceleration, and thus reducing shocks to the equipment which tend to occur where reversals are made abruptly as by limiting switches. To illustrate this point, reference is made to FIGURE 14 which represents diagrammatically the surface of a simple cylindrical mandrel slit along one side and then flattened out into the plane of the drawing. On this diagram there is shown the winding path F of a single roving or filament. As this path approaches the right hand end of the mandrel shown toward the right of FIGURE 14, a curved portion F' appears, this portion being that provided by the harmonic reversal at the end of a stroke as provided by the action of the roller 41 carried by the chains 42 and operating between the tracks 40—40. The winding path then continues as indicated at F2 at the opposite helix angle. This diagram further illustrates by the dash line at the extreme right of the figure the winding pattern which is provided by a limit switch type of reversal of the traverse motion. From these dash lines it will be seen that this winding pattern includes a portion L representing a continuation of the helix of the winding prior to operation of the limit switch. As the limit switch comes into effect, a circumferential portion of the winding pattern such as indicated at L' occurs, and thereafter upon completion of the reversal, the helix angle of the winding is reversed and proceeds as indicated at L2 in the direction opposite to the first part of the winding.

The harmonic type of reversal is highly desirable for for most purposes, and is especially important with typical helical patterns, i.e., patterns having a helix angle of at least 70°, i.e., a helical pitch of more than 20°. In the equipment of the kind described, the diameter of the sprockets carrying the traverse chains 42 controls the sharpness of reversal of the filament winding pattern on the mandrel, and with typical helical patterns of the kind mentioned just above, the diameter of the sprockets carrying the chains 42 should not be less than about ½ the diameter of the mandrel. This will give sufficient "wrap" of the filament around the end portion of the mandrel during the harmonic reversal to avoid tendency for the curved reversing portion of the pattern to loosen on the mandrel.

It is here further pointed out that any variation of the following factors will influence the winding pattern:

(a) the axial length of the winding pattern and thus the length of the traverse chains 42
(b) diameter of the mandrel
(c) diameter of the sprockets carrying the traverse chains 42
(d) the speed ratio of traverse mechanism and mandrel rotation, which determines the helical angle or pitch.

As the equipment of the present invention is capable of highly accurate reproduction of a winding pattern, it is possible with the equipment of the invention to reproduce exactly the same helical pattern each time the traverse mechanism travels in a given direction, in view of which the filaments would be laid one above another. In this way it is possible to produce what might be termed a "basket weave." This, however, is not desired for certain purposes where it is preferred to have the reinforcement distributed more completely throughout the cylindrical wall being built up. Therefore, except where a basket weave is deliberately intended, it is contemplated in connection with the traverse mechanism that any one of the four factors above should be adjusted or altered in order to avoid exact duplication of the preceding layers of helical windings, thus avoiding having the turns of the helical pattern in coincident position each time the traverse occurs in one direction or the other.

Since the equipment of the invention also includes reversing mechanism, including the alternatively actuable clutches 57 (see FIGURE 11) and the limit switches 87 and 88, it is also possible with the equipment of the invention to effect a localized build up of windings at any point or at any time desired in the operation, for instance in order to fill a groove in the mandrel such as indicated at 92 in FIGURE 1b. While this reversing traverse mechanism is of the "shock" type, nevertheless it is here preferably contemplated for use only where the helical angle is relatively large, for instance above about 70° (i.e. a pitch angle of less than about 20°). Winding patterns of this type are preferably employed where only a very limited axial length of the mandrel is to be covered by such windings (for instance groove 92), and with windings of this type, the pitch angle is so low and thus the traverse motion so slow that the shock effect is not appreciable.

From the foregoing it will be seen that the equipment of the present invention is highly flexible or adaptable being capable of use in a variety of ways and for many purposes, being capable of traverse action over a very wide range of speeds in relation to the mandrel speed. At the same time high accuracy of reproducing patterns is provided for not only because of the interrelated and positively synchronized drives for the traverse mechanism and the mandrel, but also because of the straight line feed of the filaments in a path the axis of which intersects the axis of rotation of the mandrel and from which path the filaments are deflected to a path tangent to the mandrel. This is accomplished by means of a guide which automatically follows the helical angle of the winding pattern and even automatically follows the winding pattern at the region of the harmonic reversals at the ends of the traverse strokes.

I claim:
1. A filament winding machine comprising:
 (a) a mandrel adapted to receive a plurality of filaments thereon;
 (b) means supporting said mandrel for rotation about an axis;
 (c) a filament feed guide mounted for reciprocable movement in the direction of said axis;
 (d) a drive system for imparting reciprocating motion to said filament feed guide axially of said mandrel including mechanism providing for reciprocating strokes of said guide with harmonic motion reversal thereof at the ends of the strokes; and
 (e) means operable at will to effect repeated reversal of the direction of motion of said guide thus estab- lishing a reciprocating stroke of said guide that is shorter than the stroke provided by continuous rotation of said mechanism in one direction.

2. A filament winding apparatus comprising:
(a) a mandrel adapted to receive a plurality of filaments thereon;
(b) means supporting said mandrel for rotation about an axis;
(c) a filament feed guide mounted for reciprocable movement in the axial direction of said mandrel;
(d) drive mechanism for imparting reciprocating motion to said filament feed guide including:
  (i) a pair of wheels arranged on axes substantially perpendicular to the rotational axis of said mandrel and spaced from each other axially of the mandrel,
  (ii) an endless drive element passing around said drive wheels,
  (iii) means for driving one of said wheels and thus the endless drive element, and
  (iv) drive means connecting said endless drive element with the filament feed guide to effect reciprocation thereof;
(e) means for rotating said mandrel a multiplicity of times during each traverse of said filament guide; and
(f) means operable at will to effect repeated reversal of the direction of drive of said driven wheel and thus establish a reciprocating stroke of the filament feed guide that is shorter than the stroke provided by continuous rotation of said driven wheel in one direction.

3. The invention of claim 2 including:
(a) a limit device adjustable axially of the mandrel for varying the reciprocating stroke of the filament feed guide provided by reversal of said drive wheel.

4. The invention of claim 3 including:
(a) a second means for mounting a second mandrel on which filaments are to be wound, said second mounting means being arranged axially of the first mounted means and being connected with the first mandrel for rotation therewith;
(b) a second filament guide positioned to cooperate with said second mandrel;
(c) a second carriage on which the second guide is mounted; and
(d) means for effecting traverse motion of the second carriage and the guide carried thereby comprising a push-pull member connecting the second carriage with the first carriage.

5. A filament winding machine comprising:
(a) means for mounting a rotatable mandrel on which filaments are to be wound;
(b) traverse mechanism comprising a filament feeding guide and drive means for imparting reciprocating motion to said guide axially of a mandrel mounted in said mandrel-mounting means;
(c) said drive means comprising a pair of wheels arranged on axes disposed perpendicular to the rotational axis of the mandrel and spaced from each other axially of the mandrel;
(d) an endless drive element passing around said drive wheels;
(e) means connecting said endless drive element with the filament feeding guide to effect reciprocation thereof; and
(f) drive mechanism for the mandrel and for the traverse mechanism providing for continuous drive of the endless drive element in a given direction in a coordinated relationship to the drive of the mandrel, said drive mechanism including a speed-change mechanism comprised of a plurality of groups of shiftable gears providing a transmission system with input and output shafts whereby a plurality of changes in the speed of the endless driving element is effected in incremental steps relative to the speed of rotation of said mandrel.

6. In a filament winding apparatus the improvement comprising:
(a) a mandrel rotatably mounted for rotation about an axis on which said filaments are to be wound;
(b) a resin reservoir mounted substantially horizontally and perpendicular to the axis of rotation of said mandrel;
(c) a filament entrance aperture in one end of said reservoir;
(d) a filament exit aperture at the other end of said reservoir, said filament entrance and exit apertures providing a straight line filament feed path through said reservoir;
(e) filament guide means connected to said resin reservoir and disposed intermediate said filament exit aperture and said mandrel for delivering an impregnated filament to said mandrel; and
(f) means to reciprocate simultaneously said resin reservoir and said filament guide means both in coordinated relation to the rotational speed and axially of said mandrel, whereby said filaments are wound on said mandrel.

7. The invention of claim 6 wherein:
(a) said resin reservoir is adapted to receive and hold a quantity of resin through which said filament passes and becomes resin wet; and including
(b) means to warm said resin and maintain it in a relatively fluid condition whereby said filament is more readily wetted by said resin.

8. A filament winding machine comprising means for mounting a rotatable mandrel on which filaments are to be wound, and traverse mechanism comprising a filament feeding guide and drive means for imparting reciprocating motion to said guide axially of a mandrel mounted in the machine, the drive means comprising a pair of wheels arranged on axes perpendicular to the rotational axis of the mandrel and spaced from each other axially of the mandrel, an endless drive element passing around said drive wheels, means connecting said endless drive element with the filament feeding guide to effect reciprocation thereof, and drive mechanism for the mandrel mounting means and for the traverse mechanism providing for continuous drive of the endless drive element in a given direction in a coordinated relationship to the drive of the mandrel mounting means, the drive mechanism comprising an infinitely variable speed drive means by said source and transmission parts delivering power to both the mandrel mounting means and the endless driving element, the transmission parts delivering power to the endless driving element further including shiftable gears providing stepwise shift of the driving speed of the endless driving element in relation to the driving speed of the mandrel mounting means.

9. A filament winding machine comprising means for mounting a rotatable mandrel on which filaments are to be wound, and traverse mechanism comprising a filament feeding guide and drive means for imparting reciprocating motion to said guide axially of a mandrel mounted in the machine, the drive means comprising a pair of wheels arranged on axes perpendicular to the rotational axis of the mandrel and spaced from each other axially of the mandrel, an endless drive element passing around said drive wheels, means connecting said endless drive element with the filament feeding guide to effect reciprocation thereof, and drive mechanism for the mandrel mounting means and for the traverse mechanism providing for continuous drive of the endless drive element in a given direction in a coordinated relationship to the drive of the mandrel mounting means, the drive mechanism comprising, in combination with a power source, transmission parts for delivering power from said source to both the mandrel mounting means and the endless driving element, the transmission parts to the endless driving element including an infinitely variable speed device in series with shiftable gears providing stepwise shift of the driving speed of the endless driving element.

10. A filament winding machine comprising means for mounting a rotatable mandrel on which filaments are to be wound, and traverse mechanism comprising a filament feeding guide and drive means for imparting reciprocating motion to said guide axially of a mandrel mounted in the machine, the drive means comprising a pair of wheels arranged on axes perpendicular to the rotational axis of the mandrel and spaced from each other axially of the mandrel, an endless drive element passing around said drive wheels, means connecting said endless drive element with the filament feeding guide to effect reciprocation thereof, and drive mechanism for the traverse mechanism including a shaft for one of the wheels carrying said endless driving element, a pair of oppositely driven shafts and clutches for alternatively connecting said oppositely driven shafts with said wheel shaft.

11. A construction according to claim 5 and further including yielding squeegee elements positioned in the resin reservoirs to engage a filament in said straight line feed path.

References Cited by the Examiner

UNITED STATES PATENTS

| | | | |
|---|---|---|---|
| 1,924,559 | 8/1933 | Lathrop | 74—353 |
| 2,048,817 | 7/1936 | Rosengarth | 156—429 |
| 2,127,413 | 8/1938 | Leguillon | 118—405 X |
| 2,615,491 | 10/1952 | Harris et al. | 156—429 |
| 2,647,488 | 8/1953 | Shive | 118—405 |
| 2,731,376 | 1/1956 | Rusch | 156—175 |
| 2,798,531 | 7/1957 | Jackson | 242—158 |
| 2,819,622 | 1/1958 | Haxton | 74—353 |
| 2,984,286 | 5/1961 | Copenhefer | 156—174 X |
| 2,991,210 | 7/1961 | Matkovich | 156—175 |
| 3,023,135 | 2/1962 | Wiltshire | 156—175 X |
| 3,025,205 | 3/1962 | Young | 156—169 |
| 3,051,602 | 8/1962 | Schairbaum | 156—174 X |

FOREIGN PATENTS 12,071  5/1911  Great Britain.

EARL M. BERGERT, *Primary Examiner.*

B. S. TAYLOR, J. P. MELOCHE, *Assistant Examiners.*